(12) United States Patent
Matsumoto et al.

(10) Patent No.: US 12,302,782 B2
(45) Date of Patent: May 20, 2025

(54) WORK MACHINE

(71) Applicant: HONDA MOTOR CO., LTD., Tokyo (JP)

(72) Inventors: Takuya Matsumoto, Wako (JP); Eri Katagiri, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 711 days.

(21) Appl. No.: 17/435,309

(22) PCT Filed: Mar. 4, 2019

(86) PCT No.: PCT/JP2019/008454
§ 371 (c)(1),
(2) Date: Aug. 31, 2021

(87) PCT Pub. No.: WO2020/178959
PCT Pub. Date: Sep. 10, 2020

(65) Prior Publication Data
US 2022/0151140 A1    May 19, 2022

(51) Int. Cl.
*A01D 34/76* (2006.01)
*A01D 34/00* (2006.01)

(52) U.S. Cl.
CPC .................... *A01D 34/006* (2013.01)

(58) Field of Classification Search
CPC ....... A01D 34/006; A01D 34/68; A01D 34/76
USPC .......................................................... 701/93
See application file for complete search history.

(56) References Cited

U.S. PATENT DOCUMENTS

| | | | |
|---|---|---|---|
| 4,991,382 A | | 2/1991 | Scag |
| 5,375,674 A | * | 12/1994 | Peter .................. A01D 34/6806 56/11.1 |
| 5,771,481 A | * | 6/1998 | Gilling .................. B60K 28/04 180/170 |
| 6,279,937 B1 | * | 8/2001 | Hunt ...................... F16H 59/06 180/336 |
| 9,991,825 B1 | * | 6/2018 | Ackerman ................ H02P 7/06 |
| 2006/0053763 A1 | * | 3/2006 | Stover .................. A01D 34/824 56/14.7 |
| 2007/0169743 A1 | * | 7/2007 | Kobayashi .............. F02D 11/10 123/352 |
| 2009/0201650 A1 | * | 8/2009 | Hauser .................... B60L 15/38 361/736 |

(Continued)

FOREIGN PATENT DOCUMENTS

| | | | | |
|---|---|---|---|---|
| CA | 2280538 C | * | 2/2004 | ......... A01D 34/6806 |
| DE | 19964347 A1 | * | 11/2003 | ......... A01D 34/6806 |

(Continued)

OTHER PUBLICATIONS

International Preliminary Report on Patentability, dated Sep. 16, 2021, 8 pages.

(Continued)

*Primary Examiner* — B M M Hannan
(74) *Attorney, Agent, or Firm* — Rankin, Hill & Clark LLP (57) ABSTRACT

A work machine includes a control unit that starts cruise control that continues a travel ON mode of the travel unit even if travel levers, functioning as a travel operator, are in a state corresponding to a travel OFF mode. As a result, work is enabled to be performed at constant travel speed with ease.

13 Claims, 8 Drawing Sheets

(56) References Cited

U.S. PATENT DOCUMENTS

| | | | | |
|---|---|---|---|---|
| 2012/0159916 | A1* | 6/2012 | Ishii | B60L 58/40 |
| | | | | 56/10.2 G |
| 2013/0081500 | A1* | 4/2013 | Helin | A01D 34/82 |
| | | | | 474/8 |
| 2013/0175105 | A1* | 7/2013 | Gallazzini | B60K 17/28 |
| | | | | 180/170 |
| 2013/0274983 | A1* | 10/2013 | Matsuda | B60L 15/20 |
| | | | | 701/22 |
| 2014/0069072 | A1* | 3/2014 | Gamble | F16H 61/431 |
| | | | | 56/10.2 A |
| 2014/0121952 | A1* | 5/2014 | Fujimoto | B60K 35/00 |
| | | | | 701/113 |
| 2014/0208709 | A1* | 7/2014 | Helin | A01D 34/6806 |
| | | | | 56/11.1 |
| 2015/0308569 | A1* | 10/2015 | Heathcoat, Jr. | B62D 6/02 |
| | | | | 701/41 |
| 2018/0077862 | A1* | 3/2018 | Smith | A01D 34/6806 |
| 2018/0146617 | A1* | 5/2018 | Oota | A01D 34/824 |
| 2018/0146619 | A1* | 5/2018 | Oota | A01D 34/824 |
| 2019/0075724 | A1* | 3/2019 | Becke | A01D 34/006 |
| 2021/0337727 | A1* | 11/2021 | Dong | A01D 34/6818 |

FOREIGN PATENT DOCUMENTS

| | | | | | |
|---|---|---|---|---|---|
| DE | 102013018038 | A1 * | 6/2015 | | B60K 31/00 |
| EP | 2551141 | A2 * | 1/2013 | | B60K 35/00 |
| JP | 59-37185 | P | 3/1984 | | |
| JP | H0530835 | A * | 2/1993 | | |
| JP | H05233058 | A * | 9/1993 | | |
| JP | H07-88136 | | 4/1995 | | |
| JP | 2005343187 | A * | 12/2005 | | |
| JP | 2012167789 | A * | 9/2012 | | |
| JP | 2014195360 | A * | 10/2014 | | |
| JP | 2015045382 | A * | 3/2015 | | |
| JP | 5708005 | B2 * | 4/2015 | | |
| JP | 5736286 | B2 * | 6/2015 | | |
| JP | 5778538 | B2 * | 9/2015 | | |
| JP | 5821782 | | 11/2015 | | |
| JP | 2017-163921 | | 9/2017 | | |
| JP | 2018085980 | A * | 6/2018 | | A01B 33/028 |
| WO | WO-2013066526 | A1 * | 5/2013 | | A01D 34/006 |
| WO | WO-2018101086 | A1 * | 6/2018 | | A01D 34/68 |

OTHER PUBLICATIONS

German Office Action from Corresponding German application No. 11 2019 006 974.8, dated Mar. 5, 2024, 4 pages.
International Search Report, Date of mailing, 2 pages.
Written Opinion of the International Searching Authority dated May 22, 2019 filed in PCT/JP2019/008454, 4 pages.

* cited by examiner

WORK MACHINE

TECHNICAL FIELD

The present invention relates to a work machine.

BACKGROUND ART

Walk-type work machines are known that include a work unit, a travel motor for causing a machine body to travel, a travel lever for operating the travel motor, and a work lever for operating a work motor included in the work unit (Patent Literature 1, for example). This type of work machine is brought to a work ON mode (corresponding to a work motor ON mode) by operation of the work lever and to a travel ON mode (corresponding to a travel motor ON mode) by operation of the travel lever so as to be able to start work, such as lawn mowing or the like. If the user of the work machine moves the hands off the travel lever while the work machine is traveling, the work machine is automatically brought to a travel OFF mode (corresponding to a travel motor OFF mode).

CITATION LIST

Patent Literature

[Patent Literature]1

Japanese Patent Laid-Open No. 2017-163921

SUMMARY OF INVENTION

Technical Problem

The conventional configuration allows a travel speed to change in accordance with how deep the travel lever is pressed and thus poses difficulty in performing the work at constant travel speed. Additionally, the conventional configuration requires a user to keep pressing the travel lever with fingers or the like while the work machine is traveling and thus may cause tiredness of the user.

Accordingly, an object of the present invention is to enable work to be performed at constant travel speed with ease.

Solution to Problem

To attain the object described above, a work machine includes: a work unit for performing predefined work; a travel unit for causing a machine body to travel; a work operator capable of being operated to switch the work unit between a work ON mode and a work OFF mode; and a travel operator capable of being operated to switch the travel unit between a travel ON mode and a travel OFF mode, wherein the work machine includes a control unit configured to start cruise control that continues the travel ON mode of the travel unit in a state in which the work operator has been operated for the work ON mode, even when the travel operator is in a state corresponding to the travel OFF mode.

In the configuration described above, the control unit starts the cruise control when predefined operation is performed in a state in which the work operator has been operated for the work ON mode and the travel operator has been operated for the travel ON mode.

Additionally, in the configuration described above, the work machine includes a cruise operator that is another operator different from the work operator and the travel operator, wherein the predefined operation is operation of the cruise operator.

Additionally, in the configuration described above, the control unit ends the cruise control when the cruise operator is operated after the starting of the cruise control.

Additionally, in the configuration described above, the cruise operator is in a location that enables the cruise operator to be operated while both of the work operator and the travel operator are being operated.

Additionally, in the configuration described above, the predefined operation is cruise-starting operation performed on the travel operator, the cruise-starting operation having been predetermined in advance.

Additionally, in the configuration described above, when the travel operator is operated from the state corresponding to the travel OFF mode to a state corresponding to the travel ON mode after the starting of the cruise control, the control unit ends the cruise control and controls the travel unit in accordance with operation of the travel operator.

Advantageous Effect of Invention

An aspect of the present invention enables work to be performed at constant travel speed with ease.

DESCRIPTION OF EMBODIMENTS

Embodiments of the present invention are described below with reference to the drawings.

First Embodiment

Figure 1:
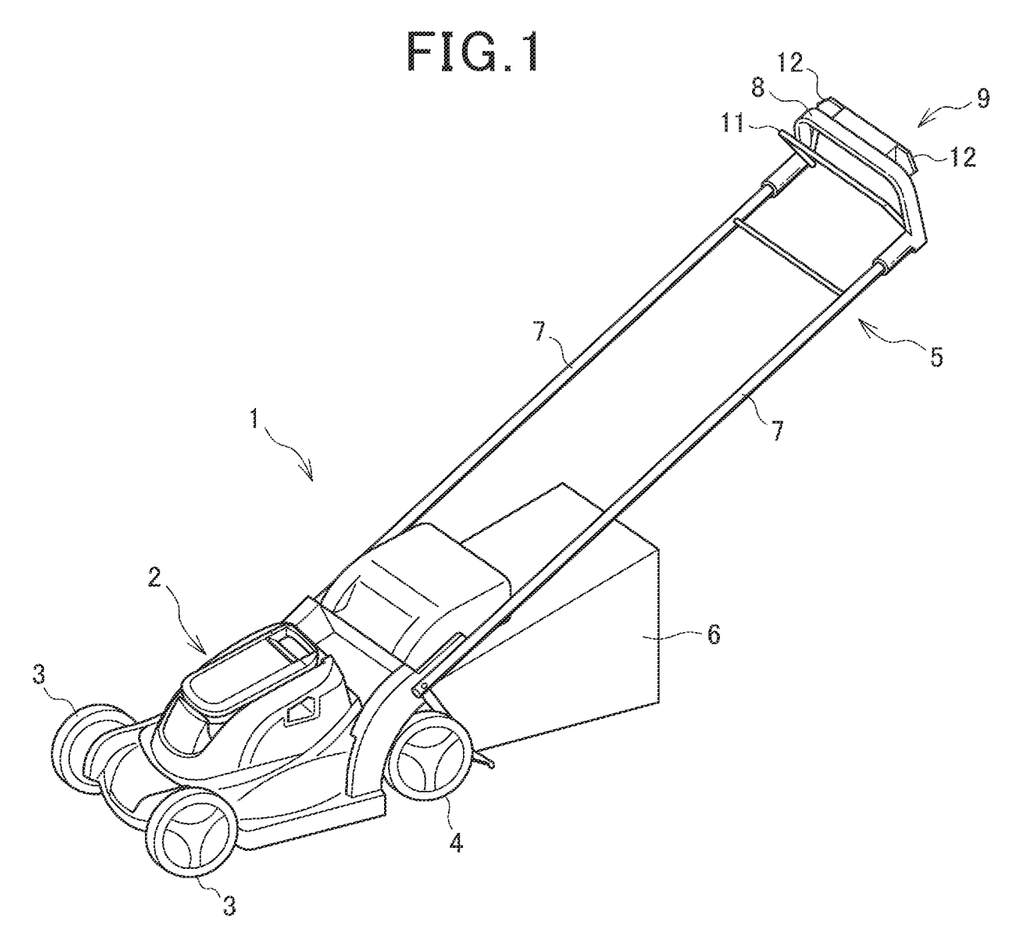
FIG. 1 is a perspective view of a work machine according to a first embodiment.

FIG. 1 is a perspective view of a work machine according to a first embodiment.

A work machine 1 is a walk-type lawn mower, more specifically, a walk-behind lawn mower. The work machine 1 includes a main body 2 configuring a machine body, left and right pairs of front wheels 3 and rear wheels 4 rotatably supported by the main body 2, a handle 5 extending rearward and upward from the main body 2, and a grass bag 6 coupled to a lower portion of the main body 2 rearward of the main body 2.

The handle 5 includes side portions 7 extending rearward and upward from respective left and right locations of a rear portion of the main body 2, and a grip portion 8 linking rear ends of the side portions 7 and to be held by a user. An operation portion 9 to be operated by a user is located at the grip portion 8 of the handle 5. The operation portion 9 includes a group of operators to be operated by a user with the hand, specifically, the operation portion 9 includes a work lever 11, travel levers 12, and a plurality of switches (a two-motion button 13, a cruise control button 14, speed-setting operators 15 and 16 shown in FIG. 2).

Figure 2:
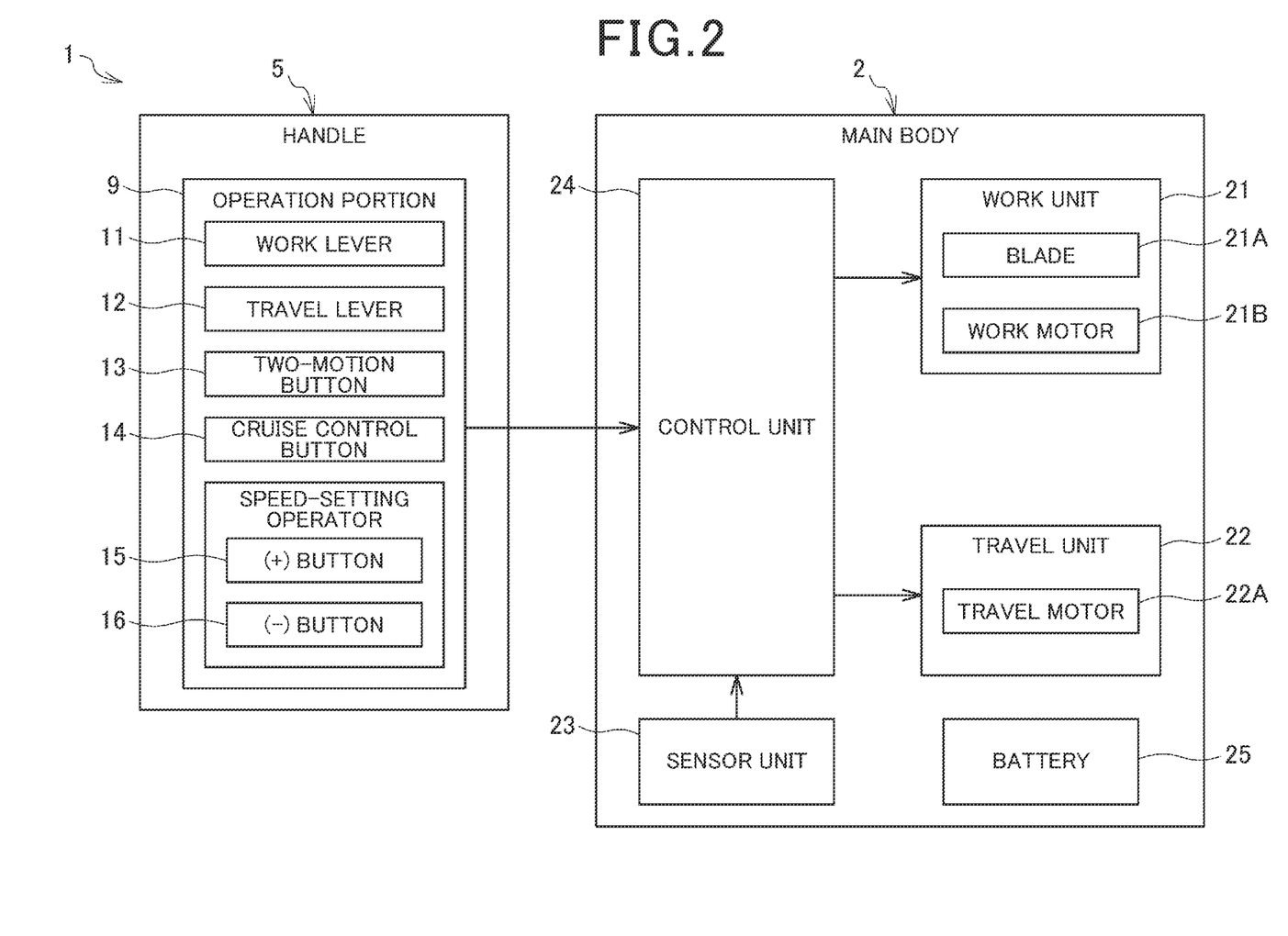
FIG. 2 is a block diagram showing a configuration of the work machine.

FIG. 2 is a block diagram showing a configuration of the work machine 1.

The main body 2 of the work machine 1 includes a work unit 21 that performs predefined work, a travel unit 22 that causes the main body 2 to travel, a sensor unit 23 for detecting various types of information, a control unit 24 that controls each unit of the work machine 1, and a battery 25 that supplies electric power to each unit of the work machine 1.

The work unit 21 includes a blade 21A including a cutting edge, and a work motor 21B that rotates the blade 21A. The work unit 21 rotates the blade 21A under the control of the control unit 24 to enable lawn mowing work.

The travel unit 22 includes a travel motor 22A that rotates the left and right rear wheels 4 (driving wheels). The travel unit 22 rotates the wheels 4 under the control of the control unit 24 to enable the work machine 1 to travel. The sensor unit 23 includes sensors such as rotational angle sensors that detect rotational angles of the work motor 21B and the travel motor 22A, and a tilt angle sensor that detects a tilt angle of the main body 2. The sensor unit 23 outputs a result of detection to the control unit 24.

The control unit 24 includes a microcomputer and a peripheral circuit. The control unit 24 receives a result of operation of the operation portion 9 and a result of detection by the sensor unit 23 and controls the work unit 21 and the travel unit 22 on the basis of information received. The control unit 24 of the present embodiment also includes a function of a cruise controller that performs cruise control for traveling at constant speed under a predefined condition. The function of the cruise controller may be achieved by a dedicated IC or by software executed by the microcomputer.

The battery 25 is detachably attachable to the main body 2. The battery 25 is charged with external electric power, and supplies charged power to the work unit 21, the travel unit 22, the control unit 24, and the like.

Figure 3:
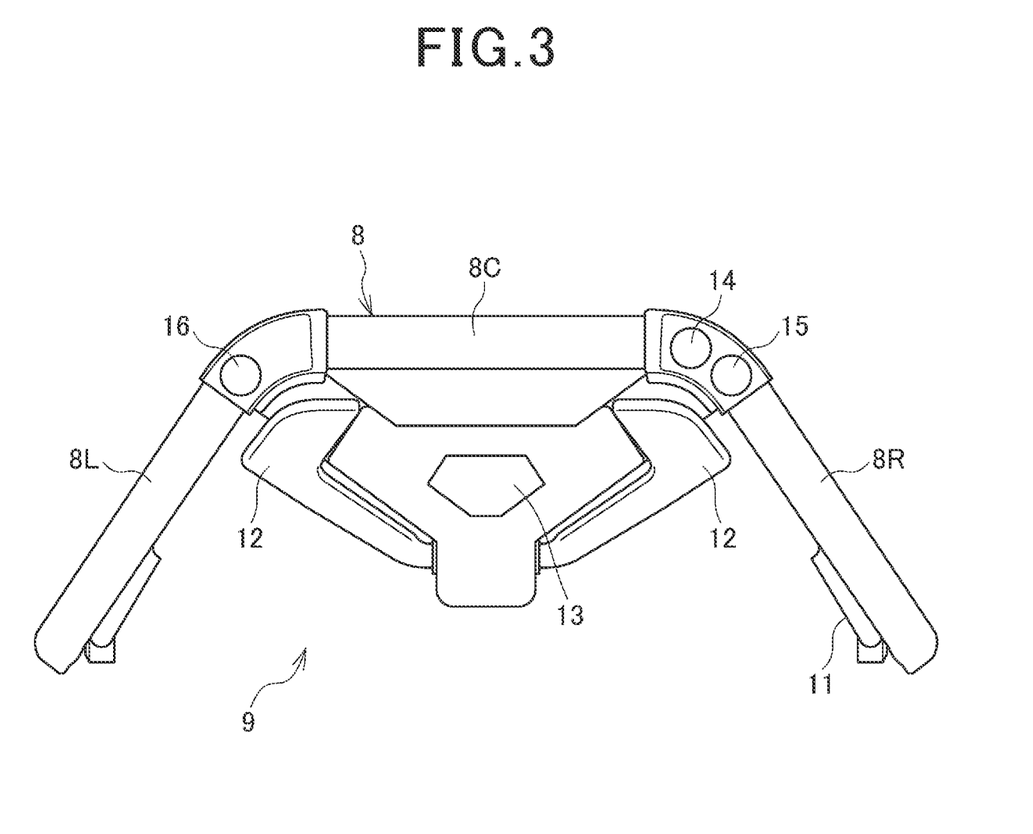
FIG. 3 is a view of a grip portion and an operation portion as observed from a user.
Figure 4:
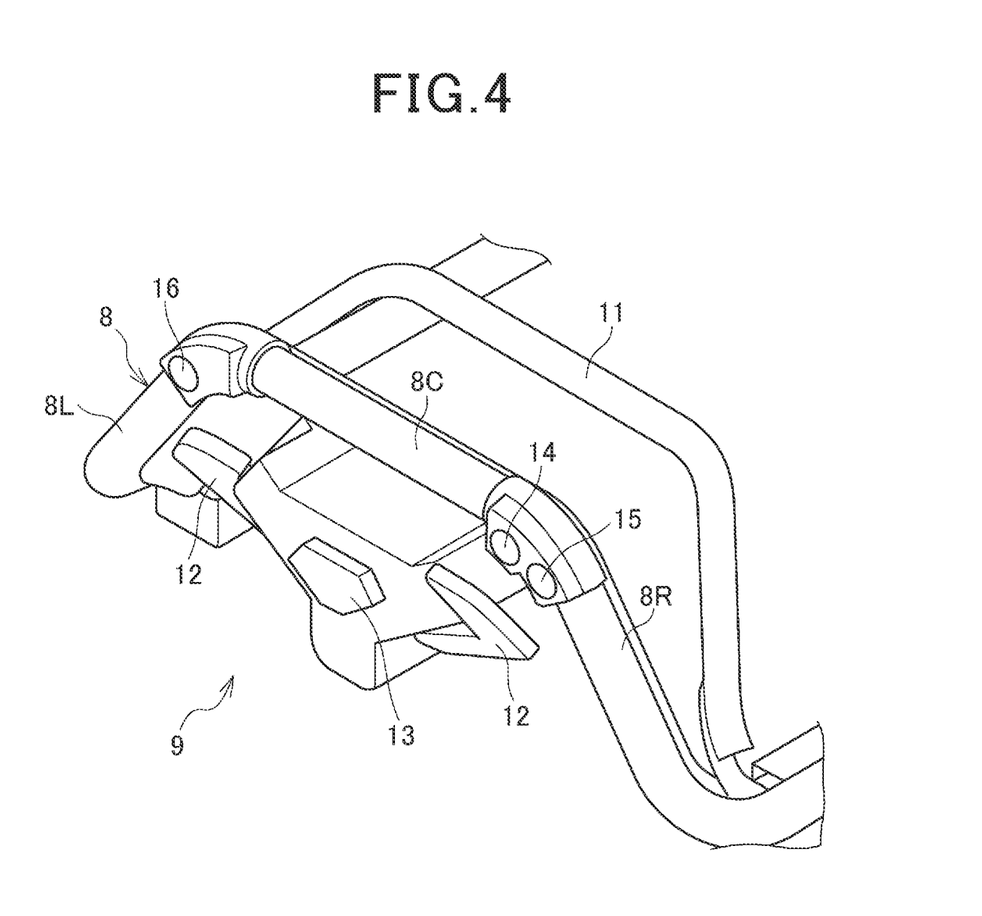
FIG. 4 is a perspective view of the grip portion and the operation portion.

FIG. 3 is a view of the grip portion 8 and the operation portion 9 as observed from a user. FIG. 4 is a perspective view of the grip portion 8 and the operation portion 9.

As shown in FIG. 3, the grip portion 8 has a gate shape having an opening at a lower side when viewed from behind the work machine 1. The grip portion 8 includes a left portion, a right portion, and a center portion in a side-to-side direction as grip portions 8L, 8R, and 8C, respectively. The grip portions 8L, 8R, and 8C can be independently held by a user. As shown in FIGS. 3 and 4, in an area near the left and right grip portions 8L and 8R and the center grip portion 8C, the work lever 11, the travel levers 12, and the two-motion button 13 are located spaced apart from the grip portions 8L, 8R, and 8C. Due to the spacing, the work lever 11, the travel levers 12, and the two-motion button 13 do not obstruct a user holding any of the grip portions 8L, 8R, and 8C.

The work lever 11 is located forward of the grip portion 8, swingable forward and rearward, and biased forward. The work lever 11 is a work operator capable of being operated to switch the work unit 21 between a work ON mode and a work OFF mode. The work lever 11 can be operated by a user while the user is holding any of the grip portions 8L, 8R, and 8C. When the work lever 11 receives no external force, the work lever 11 automatically returns to a predefined forward position.

The control unit 24 determines that the "work OFF mode" is entered when the work lever 11 is in a position corresponding to non-operation, and the control unit 24 determines that the "work ON mode" is entered when the work lever 11 is operated and the two-motion button 13 is operated. When the work OFF mode is entered, the control unit 24 stops the work motor 21B to stop the work unit 21. When the work ON mode is entered, the control unit 24 rotates the work motor 21B and controls the rotational speed of the work motor 21B such that the rotational speed changes in accordance with the operation amount of the work lever 11.

The travel levers 12 are located rearward of the grip portion 8, swingable forward and rearward, and biased rearward. The travel levers 12 are a travel operator capable of being operated to switch the travel unit 22 between a travel ON mode and a travel OFF mode. The travel levers 12 are provided as a left and right pair and can be operated by a user while the user is holding any of the grip portions 8L, 8R, and 8C. When the travel levers 12 receive no external force, the travel levers 12 automatically return to predefined rearward positions.

The control unit 24 determines that the "travel OFF mode" is entered when the travel levers 12 are in positions corresponding to non-operation, and the control unit 24 determines that the "travel ON mode" is entered when the travel levers 12 are operated. When the travel OFF mode is entered, the control unit 24 stops the travel motor 22A to stop the travel unit 22 and keep the travel unit 22 stopped. When the travel ON mode is entered, the control unit 24 rotates the travel motor 22A and controls the rotational speed of the travel motor 22A such that the rotational speed changes in accordance with the operation amounts of the travel levers 12.

The cruise control button 14 and the speed-setting operators 15 and 16 are located at a boundary between the grip portions 8L and 8C and a boundary between the grip portions 8R and 8C. These operators 14 to 16 are of a press down type and easily operable by a user while the user is holding any of the grip portions 8L, 8R, and 8C, which are near the operators 14 to 16.

Figure 5:
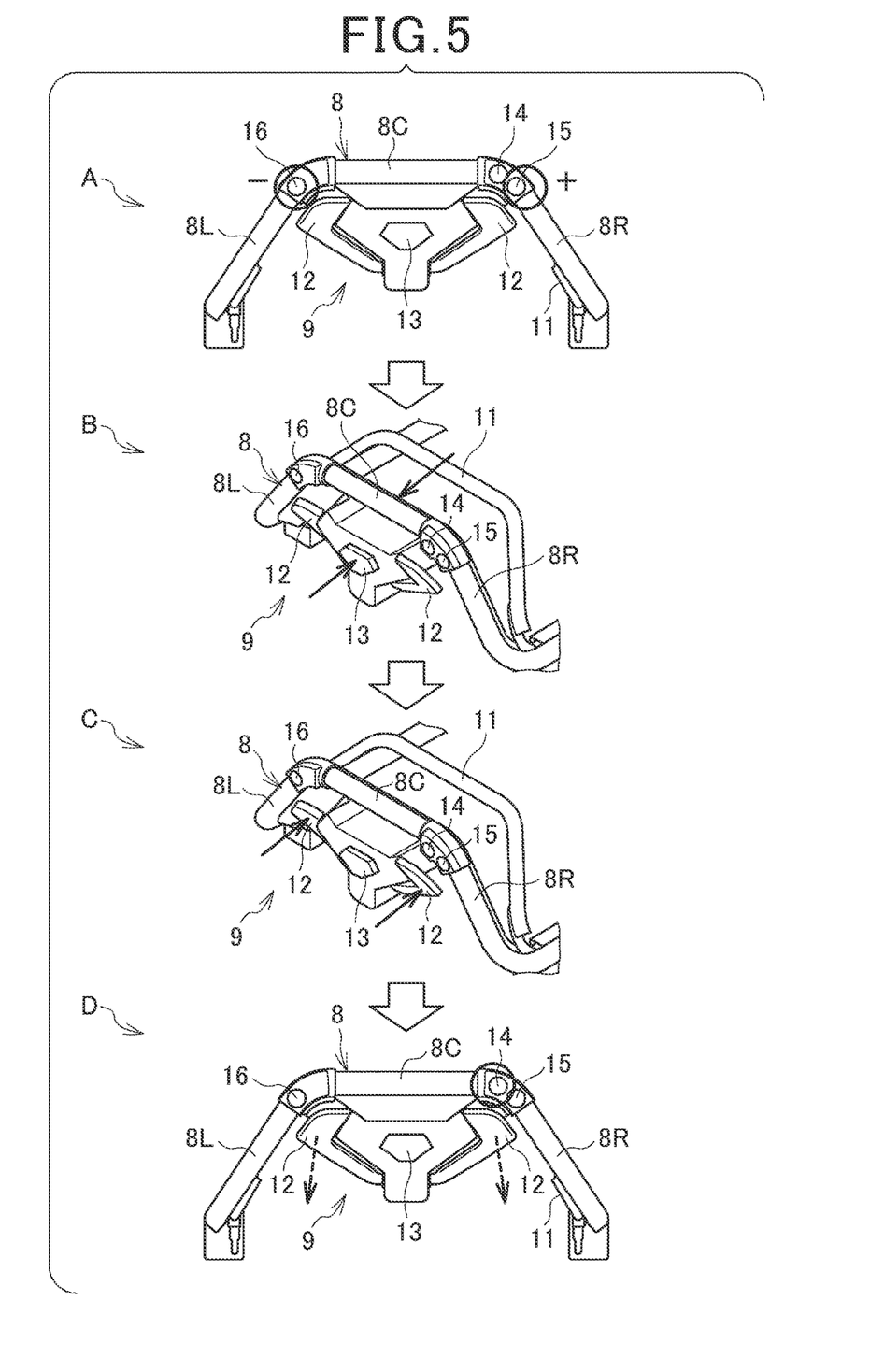
FIG. 5 is a diagram showing operation from a nonoperational state of the work machine in time sequence.

FIG. 5 is a diagram showing operation from a nonoperational state of the work machine 1 in time sequence. In FIG. 5 and subsequent drawings, a circle indicates a location of operation, and an arrow indicates a direction of operation.

When any one of the speed-setting operators 15 and 16 is operated as indicated by symbol A, the control unit 24 receives a travel speed setting via the operation of the speed-setting operator 15 or 16. Specifically, one of the speed-setting operators 15 and 16 functions as an operator to receive a travel speed increase setting, and the other of the speed-setting operators 15 and 16 functions as an operator to receive a travel speed decrease setting. Such a travel speed setting can be received via the operation of the speed-setting operator 15 or 16 at a later timing.

When both of the two-motion button 13 and the work lever 11 are operated as indicated by symbol B, the control unit 24 determines that the work ON mode is entered. When the work ON mode is entered, the control unit 24 rotates the work motor 21B and controls the rotational speed of the work motor 21B such that the rotational speed changes in accordance with the operation amount of the work lever 11.

When the travel levers 12 are operated as indicated by symbol C, the control unit 24 determines that the travel ON mode is entered. When the travel ON mode is entered, the control unit 24 rotates the travel motor 22A and controls the rotational speed of the travel motor 22A such that the rotational speed changes in a range up to a maximum speed in accordance with the operation amounts of the travel levers 12. Both of the work unit 21 and the travel unit 22 are thus started, so that the work machine can cut grass while traveling over a lawn mowing area.

If, in this state, the cruise control button 14 is operated as indicated by symbol D, the control unit 24 switches from a normal operation mode to a cruise control operation mode (hereinafter referred to as cruise mode) in which constant speed travel is continued.

In the cruise mode, the control unit 24 controls the rotational speed of the travel motor 22A so as to achieve a travel speed set in advance and maintains the travel speed. The cruise mode is fixed regardless of the positions of the travel levers 12, so that the travel speed is maintained even if the travel levers 12 are in the locations corresponding to the travel OFF mode. Since the travel speed is fixed, the user can continue the lawn mowing work with the user's hands off the travel levers 12.

Figure 6:
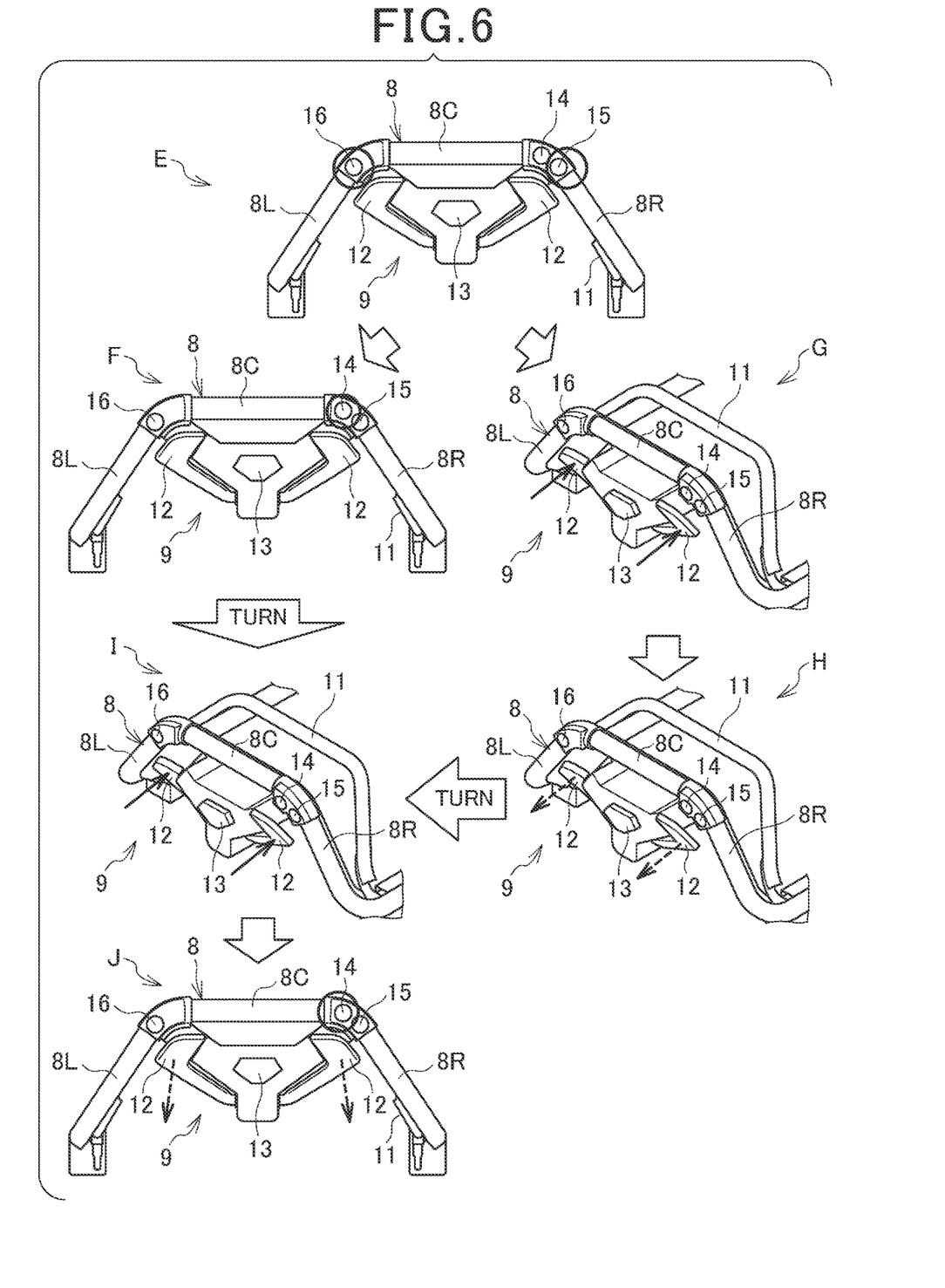
FIG. 6 is a diagram showing operation continued from FIG. 5 in time sequence.

FIG. 6 is a diagram showing operation continued from FIG. 5 in time sequence.

When the speed-setting operator 15 or 16 is operated as indicated by symbol E in the cruise mode, the control unit 24 receives a travel speed setting change via the operation of the speed-setting operator 15 or 16. Thus, the control unit 24 changes the travel speed in the cruise mode in accordance with the operation of the speed-setting operator 15 or 16.

When the cruise control button 14 is re-operated as indicated by symbol F, the control unit 24 determines that a cruise control OFF mode is entered. When the cruise control OFF mode is entered, the control unit 24 ends the cruise mode and switches to the normal operation mode. It is assumed that the travel levers 12 are in non-operation positions (in a state corresponding to the travel OFF mode) during the cruise mode; thus, the control unit 24 determines that the travel OFF mode is entered on the basis of the positions of the travel levers 12 and performs the control to stop the travel motor 22A.

When the travel levers 12 are operated from the non-operation positions (equivalent to the positions corresponding to the travel OFF mode) as indicated by symbol G in the cruise mode, the control unit 24 also determines that the cruise control OFF mode is entered. When the cruise control OFF mode is entered, the control unit 24 ends the cruise mode and switches to the normal operation mode. The control unit 24 thus performs control to achieve a travel speed in accordance with the operation amounts of the travel levers 12. Thus, the user can cancel the cruise mode before a turning point in the lawn mowing area and adjust the travel speed to suit an area where the user is located. Then, when the travel levers 12 are brought into the non-operation positions (in the state corresponding to the travel OFF mode) as indicated by symbol H, it is determined that the travel OFF mode is entered and the travel unit 22 stops traveling.

By achieving the state indicated by symbol F or H, the work machine can cancel the cruise mode and stop traveling. In actual use, the work machine can travel over a lawn mowing area in the cruise mode and, by operation to achieve the state of symbol F or I described above at a turning point in the lawn mowing area, the work machine can stop at the turning point in the lawn mowing area.

When the travel levers 12 are operated as indicated by symbol I after the work machine 1 is turned at the turning point, the control unit 24 determines that the travel ON mode is entered and adjusts the travel speed in accordance with the operation amounts of the travel levers 12; thus, the work machine 1 can start at a speed desired by the user. When the cruise control button 14 is operated as indicated by symbol J after the work machine is started, the control unit 24 switches to the cruise mode described above. Thus, the user can continue the lawn mowing work with the user's hands off the travel levers 12.

As described above, the work machine 1 according to the present embodiment performs the cruise control that continues the travel ON mode of the travel unit 22 even if the travel levers 12 are in a state corresponding to the travel OFF mode; thus, a user can continue the work with the user's hands off the travel levers 12 and easily travel at constant speed.

Additionally, the control unit 24 starts the cruise control when predefined operation is performed (in the present embodiment, the cruise control button 14 functioning as a cruise operator is operated) in a state in which the work lever 11 has been operated for the work ON mode and the travel levers 12 have been operated for the travel ON mode; thus, the cruise control can be started using a dedicated operator.

Additionally, the control unit 24 ends the cruise control when the cruise control button 14 is operated after the start of the cruise control; thus, the cruise control can be ended without providing a separate operator for ending the cruise control.

Furthermore, the cruise control button 14 is in a location that enables the cruise control button 14 to be operated while both of the work lever 11 and the travel levers 12 are being operated as shown in FIG. 4; thus, the cruise control button 14 can be easily operated while the work lever 11 and the travel levers 12 are being operated, which is favorable for improvement of operational ease.

Additionally, when the travel levers 12 are operated from a state corresponding to the travel OFF mode to a state corresponding to the travel ON mode, as shown by symbol G in an example in FIG. 6, after the start of the cruise control, the control unit 24 ends the cruise control and controls the travel unit 22 in accordance with the operation of the travel levers 12; thus, a user can end the cruise control and adjust the travel speed easily and swiftly. Thus, as described above, operation such as to end the cruise control before a turning point in a lawn mowing area and to adjust the travel speed to suit an area where the user is located is facilitated.

The present embodiment has described, as examples, a control case in which the control unit 24 performs control to end the cruise control when the cruise control button 14 is operated as shown by symbols E to F, and a control case in which the control unit 24 performs control to end the cruise control when the travel levers 12 are operated from the state corresponding to the travel OFF mode to the state corresponding to the travel ON mode as shown by symbols E to G. These control cases are, however, not limitations, and one of the control cases may be omitted, for instance. Furthermore, control relating to the start and end of the cruise control may be changed as appropriate. Other control is described as a second embodiment below.

Second Embodiment

The second embodiment is similar to the first embodiment except that the cruise control can be started and ended without using the cruise control button 14. A work machine 1 according to the second embodiment may also be able to start and end the cruise control using the cruise control button 14 described in the first embodiment. Differences from the first embodiment are described in detail below.

Figure 7:
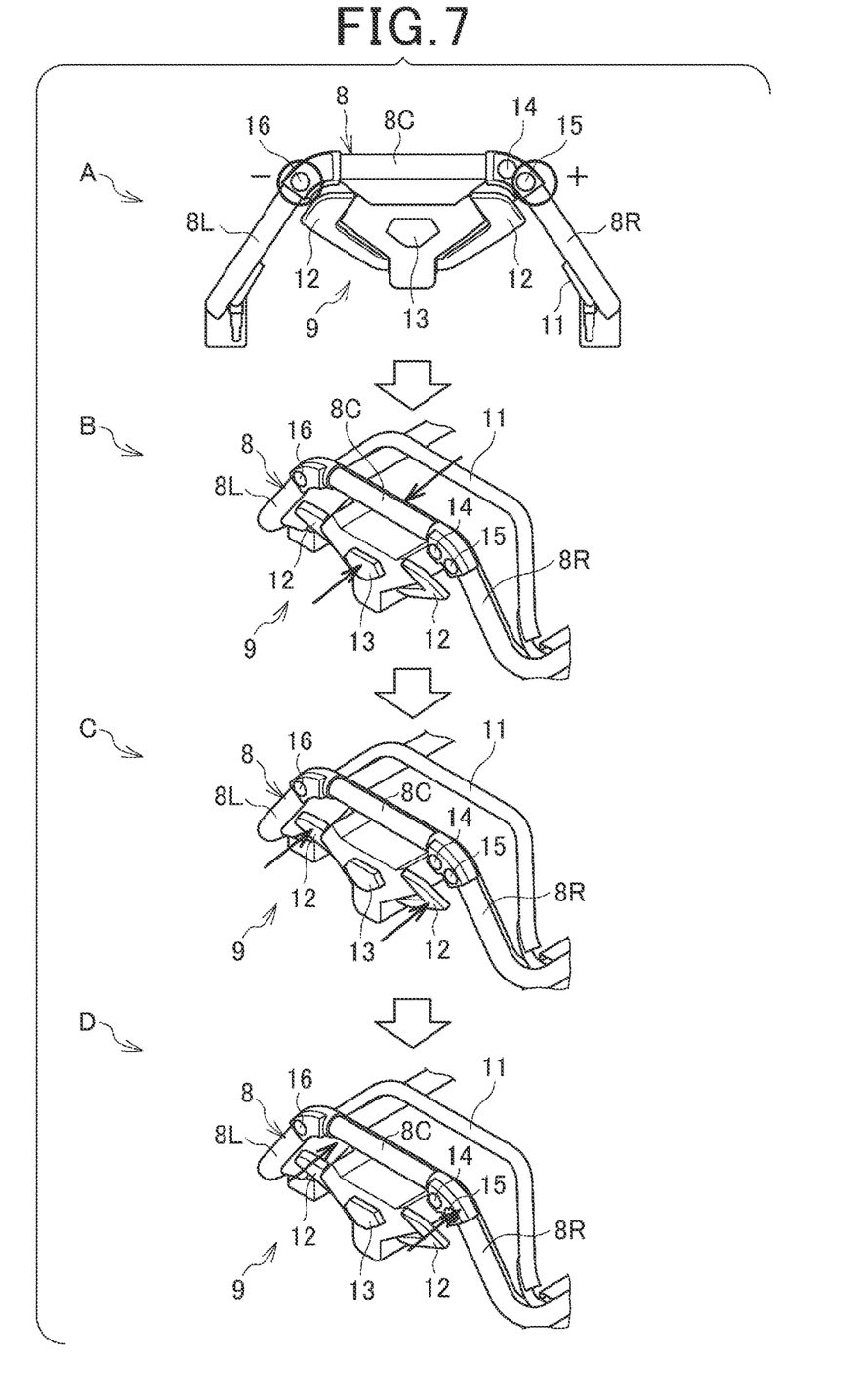
FIG. 7 is a diagram showing operation from the nonoperational state of the work machine according to a second embodiment in time sequence.
Figure 8:
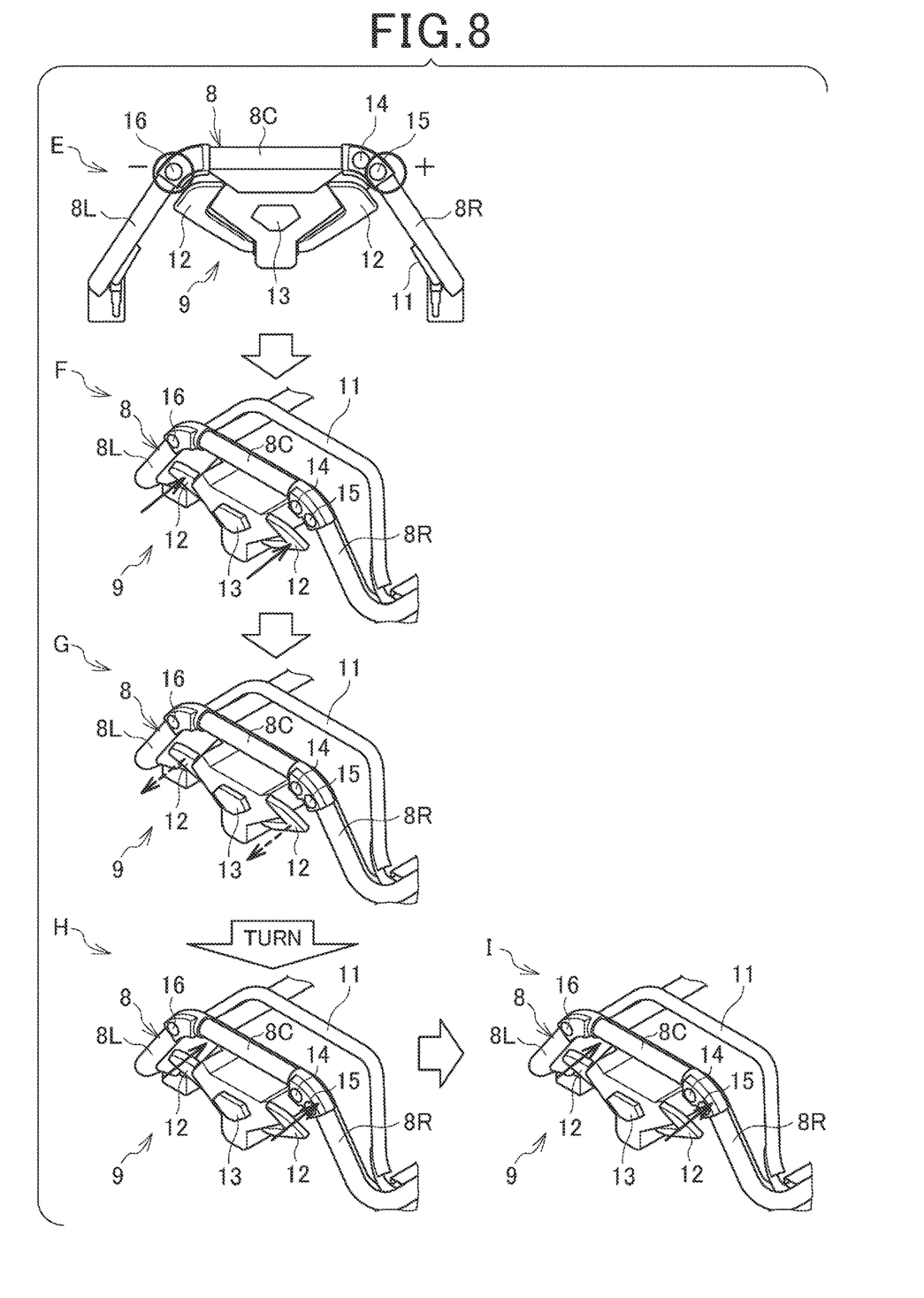
FIG. 8 is a diagram showing operation continued from FIG. 7 in time sequence.

FIG. 7 is a diagram showing operation from the nonoperational state of the work machine 1 in time sequence. FIG. 8 is a diagram showing operation continued from FIG. 7 in time sequence. Note that, although FIGS. 7 and 8 show an example in which a cruise control button 14 is included, the cruise control button 14 may be omitted if the cruise control button 14 is not used.

States indicated by symbols A to C in FIG. 7 are the same as those indicated by symbols A to C in FIG. 5. That is, a control unit 24 receives a travel speed setting via the operation of a speed-setting operator 15 or 16, then, determines that the work ON mode is entered if both of a two-motion button 13 and a work lever 11 are operated, and determines that the travel ON mode is entered if travel levers 12 are operated. A work unit 21 and a travel unit 22 are thus started to establish an operation state in which the work machine can cut grass in a lawn mowing area.

If, in the state of symbol C, predefined operation is performed on the travel levers 12 as indicated by symbol D in FIG. 7, the control unit 24 switches from the normal operation mode to the cruise mode. This predefined operation is operation to further press the travel levers 12.

In the normal operation mode, pressing the travel levers 12 prompts the control to increase the travel speed; thus, it is desirable that the predefined operation described above be differentiated from the pressing operation performed in the normal operation mode. It is desirable that a special condition be set by combining operation as appropriate, for example, operation of the travel levers 12 into regions deeper than normal use ranges, operation of the travel levers 12 into the deeper regions with operation speed of the travel levers 12 outside the normal range, operation of the travel levers 12 to in the deeper regions for a predefined time or longer, and the like. It is desirable that satisfying such a special condition achieve the switchover to the cruise mode.

States indicated by symbols E to H in FIG. 8 are the same as those indicated by the symbols E and G to I in FIG. 6. That is, the travel speed in the cruise mode can be changed as in the case of symbol E in the first embodiment, and the cruise mode can be ended by operation of the travel levers 12 and the travel speed can be adjusted swiftly to suit the area where a user is located by operation of the travel levers 12 as in the case of symbol G in the first embodiment. Also, travel can be stopped by non-operation of the travel levers 12, and, after the work machine 1 is turned, the work machine 1 can be started at a speed desired by the user by operation of the travel levers 12 as in the case of symbols H and I in the first embodiment.

If, after the work machine is started, the predefined operation as in the case of symbol D in FIG. 7 is performed on the travel levers 12 as indicated by symbol I in FIG. 8, the control unit 24 switches from the normal operation mode to the cruise mode. Thus, the user can continue the lawn mowing work with the user's hands off the travel levers 12.

The predefined operation of the travel levers 12 described above is assigned as cruise-starting operation, determined in advance to start the cruise control, in the second embodiment; thus, the second embodiment can produce an additional effect of attaining capability of starting the cruise control using an existing operator (the travel levers 12), in addition to various effects of the first embodiment. The cruise control may be started and/or ended by using another existing operator other than the travel levers 12.

Each of the embodiments described above is merely an aspect of the present invention, and any modification and application are possible in a scope that does not depart from the spirit of the present invention.

For example, the method of ending the cruise control is not limited to the methods described above. For example, the control unit 24 may determine whether the work machine 1 is pulled rearward by a user or the like and/or whether the front wheels 3 of the work machine 1 are lifted to turn the work machine 1, and when the control unit 24 determines that the work machine 1 is in any of these states, the cruise control may be ended.

Additionally, the configurations and locations of the operators 11 to 16 may be changed. For example, the work lever 11 and the travel levers 12 may be of a button type so that the work speed and the travel speed may be controlled to the pressing amounts. The work lever 11 and the travel levers 12 may be of a dial type so that the work speed and the travel speed may be controlled to the operation amounts of the dials. Additionally, the two-motion button 13, the cruise control button 14, and the speed-setting operators 15 and 16 may also be applied to operators of various publicly known types, such as toggle switches or slide switches.

Additionally, in each of the embodiments, description has been made as to the case in which the present invention is applied to the work machine 1 that is electric; however, the electric type is not a limitation. For example, the present invention may be applied to a work machine of an engine type that includes an engine that is an internal combustion engine, and a mechanism for transmitting the engine power to the work unit 21 and the travel unit 22. Furthermore, the work machine 1 for performing lawn mowing work is not a limitation, and the present invention can be applied to publicly known walk-type work machines. The present invention may also be applied to work machines of non-walk types.

REFERENCE SIGNS LIST 1 work machine
2 main body (machine body)
3 front wheel
4 rear wheel
5 handle
8 grip portion
9 operation portion
11 work lever (work operator)
12 travel lever (travel operator)
14 cruise control button (cruise operator)
15, 16 speed-setting operator
21 work unit
22 travel unit
23 sensor unit
24 control unit

The invention claimed is:
1. A work machine comprising:
a work unit that includes a blade and a work motor and performs predefined work;
a travel unit that includes a travel motor rotating driving wheels and is configured to cause a machine body to travel;
a work operator that is a work lever, a work button, or a work dial and is configured to switch the work unit between a work ON mode and a work OFF mode; and
a travel operator that is a travel lever, a travel button, or a travel dial and is configured to switch the travel unit between a travel ON mode and a travel OFF mode, wherein the travel operator is configured to be operated from a non-operation position to a predetermined operation amount, and is biased toward the non-operation position, the work machine comprises a controller configured to start cruise control that initiates the travel ON mode of the travel unit in a state in which the work operator has been operated for the work ON mode and in which the travel operator is at the non-operation position.

2. The work machine according to claim 1, wherein the controller starts the cruise control when predefined operation is performed in a state in which the work operator has been operated for the work ON mode and the travel operator has been operated for the travel ON mode.

3. The work machine according to claim 2, comprising a cruise operator that is another operator different from the work operator and the travel operator, wherein the predefined operation is operation of the cruise operator.

4. The work machine according to claim 3, wherein the controller ends the cruise control when the cruise operator is operated after the starting of the cruise control.

5. The work machine according to claim 4, wherein the cruise operator is in a location that enables the cruise operator to be operated while both the work operator and the travel operator are being operated.

6. The work machine according to claim 4, wherein, when the travel operator is operated from the state corresponding to the travel OFF mode to a state corresponding to the travel ON mode after the starting of the cruise control, the controller ends the cruise control and controls the travel unit in accordance with operation of the travel operator.

7. The work machine according to claim 3, wherein the cruise operator is in a location that enables the cruise operator to be operated while both the work operator and the travel operator are being operated.

8. The work machine according to claim 7, wherein, when the travel operator is operated from the state corresponding to the travel OFF mode to a state corresponding to the travel ON mode after the starting of the cruise control, the controller ends the cruise control and controls the travel unit in accordance with operation of the travel operator.

9. The work machine according to claim 3, wherein, when the travel operator is operated from the state corresponding to the travel OFF mode to a state corresponding to the travel ON mode after the starting of the cruise control, the controller ends the cruise control and controls the travel unit in accordance with operation of the travel operator.

10. The work machine according to claim 2, wherein the predefined operation is cruise-starting operation performed on the travel operator, the cruise-starting operation having been predetermined in advance.

11. The work machine according to claim 10, wherein, when the travel operator is operated from the state corresponding to the travel OFF mode to a state corresponding to the travel ON mode after the starting of the cruise control, the controller ends the cruise control and controls the travel unit in accordance with operation of the travel operator.

12. The work machine according to claim 2, wherein, when the travel operator is operated from the state corresponding to the travel OFF mode to a state corresponding to the travel ON mode after the starting of the cruise control, the controller ends the cruise control and controls the travel unit in accordance with operation of the travel operator.

13. The work machine according to claim 1, wherein, when the travel operator is operated from the state corresponding to the travel OFF mode to a state corresponding to the travel ON mode after the starting of the cruise control, the controller ends the cruise control and controls the travel unit in accordance with operation of the travel operator.

* * * * *